United States Patent
Kobayashi et al.

(10) Patent No.: US 11,150,713 B2
(45) Date of Patent: Oct. 19, 2021

(54) INFORMATION-PROCESSING DEVICE, CONTROL METHOD, AND PROGRAM

(71) Applicant: NEC Corporation, Tokyo (JP)

(72) Inventors: Jun Kobayashi, Tokyo (JP); Eiji Muramatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 15/542,566

(22) PCT Filed: Jan. 14, 2016

(86) PCT No.: PCT/JP2016/050953
§ 371 (c)(1),
(2) Date: Jul. 10, 2017

(87) PCT Pub. No.: WO2016/114342
PCT Pub. Date: Jul. 21, 2016

(65) Prior Publication Data
US 2017/0371391 A1    Dec. 28, 2017

(30) Foreign Application Priority Data

Jan. 15, 2015    (JP) .............................. JP2015-005769

(51) Int. Cl.
*G06F 1/30*      (2006.01)
*G08B 13/14*     (2006.01)
(Continued)

(52) U.S. Cl.
CPC ................. *G06F 1/30* (2013.01); *G06F 1/28* (2013.01); *G06F 21/88* (2013.01); *G08B 13/14* (2013.01);
(Continued)

(58) Field of Classification Search
None
See application file for complete search history.

(56) References Cited

U.S. PATENT DOCUMENTS

2003/0141980 A1* 7/2003 Moore ................. G08B 17/125
340/578
2005/0190059 A1* 9/2005 Wehrenberg ....... G08B 13/1409
340/571
(Continued)

FOREIGN PATENT DOCUMENTS

JP    61-94665     5/1986
JP    2005-242585  9/2005
(Continued)

OTHER PUBLICATIONS

Kaluza et al., Detection of Suspicious Behavior from a Sparse Set of Multiagent Interactions, 2012 Proceedings for the 11th International Conference on Autonomous Agents and Multiagent Systems, pp. 955-962 (Year: 2012).*

(Continued)

*Primary Examiner* — Luu T Pham
*Assistant Examiner* — Edward X Long

(57) ABSTRACT

An information processing device includes: a state determination unit that determines a change in a state of connection between the information processing device and an external device or a power supply; a cause selection unit that selects from a plurality of choices, a cause of the determined change in the state of connection; and a processing unit that performs a process in accordance with the selected choice.

4 Claims, 7 Drawing Sheets

(51) Int. Cl.
*G06F 1/28* (2006.01)
*G06F 21/88* (2013.01)

(52) U.S. Cl.
CPC ..... *G08B 13/1418* (2013.01); *G08B 13/1436* (2013.01)

(56) References Cited

U.S. PATENT DOCUMENTS

| | | | | |
|---|---|---|---|---|
| 2006/0128305 | A1* | 6/2006 | Delalat | H04W 12/0605 455/41.2 |
| 2007/0047524 | A1* | 3/2007 | Moriya | G06F 3/1204 370/352 |
| 2011/0093583 | A1* | 4/2011 | Piemonte | H04L 43/045 709/224 |
| 2013/0191887 | A1* | 7/2013 | Davis | H04L 63/0823 726/5 |
| 2014/0123273 | A1* | 5/2014 | Matus | H04L 63/101 726/17 |
| 2014/0129862 | A1* | 5/2014 | Kil | G06F 1/3206 713/323 |
| 2014/0321720 | A1* | 10/2014 | Bank | G06K 9/00308 382/118 |
| 2016/0197905 | A1* | 7/2016 | Libal | H04L 63/0209 726/7 |

FOREIGN PATENT DOCUMENTS

| | | |
|---|---|---|
| JP | 2006-277400 | 10/2006 |
| JP | 2012-203805 | 10/2012 |
| JP | 2014-509420 | 4/2014 |
| WO | WO 2013/105125 | 7/2013 |

OTHER PUBLICATIONS

Bandari et al., Intruder Detection in Public Space using Suspicious Behavior Phenomena and Wireless Sensor Networks, SESP'12, pp. 3-7 (Year: 2012).*
International Search Report dated Feb. 9, 2016, in corresponding PCT International Application (PCT/JP2016/050953).

* cited by examiner

| CAUSE | RESPONSE PROCESS |
|---|---|
| THEFT | DATA LOCK (OR DATA DELETION) |
| DISASTER | OPERATE IN DISASTER MODE |
| POWER CUT | RESTRICT PROCESS TO BATTERY-PROCESSING CAPABLE RANGE |
| NO PROBLEMS | NORMAL OPERATION |

| DEVICE ID | CONNECTION PORT |
|---|---|
| xxxxx | LAN PORT 1 |
| yyyyy | USB PORT 1 |

INFORMATION-PROCESSING DEVICE, CONTROL METHOD, AND PROGRAM

CROSS REFERENCE TO RELATED PATENT APPLICATIONS

This application is a National Stage Entry of International Application No PCT/JP2016/050953, filed Jan. 14, 2016, which claims priority from Japanese Patent Application No 2015-005769, filed Jan. 15, 2015; the entire contents of the above-referenced applications are expressly incorporated herein by reference.

TECHNICAL FIELD

The present invention relates to an information processing device, a control method, and a program.

BACKGROUND ART

The number of devices that store various types of data is increasing in our daily lives due to the spread of IoT (Internet of Things). These device, in some cases, are installed in unattended environments, and are increasingly exposed to the risk of theft or similar acts.

For example, Patent Document 1 discloses an information processing device. This information processing device determines a PC as being stolen, based on the acceleration detected by an acceleration sensor provided in the PC. In a case where the PC has been determined as being stolen, the information processing device turns ON the power source of the PC, and further issues an alert from the PC.

Moreover, there is a control method in which it is assumed that the information processing device has been stolen and data is locked in a case where connection to a network or a power supply is cut.

PRIOR ART DOCUMENTS

Patent Documents

[Patent Document 1] Japanese Unexamined Patent Application, First Publication No. 2005-242585

SUMMARY OF INVENTION

Problem to be Solved by the Invention

However, in an operation in which data is locked in a single uniform manner when connection to a network or a power supply is cut as with the example mentioned above, data may be locked every single time even when network connection is cut simply due to its unstable network environment. As a result, there is a problem in that unlocking becomes troublesome. Amid the advance in the coordination between devices as IoT spreads, there has been a demand for an information processing technique that enables execution of a process appropriate for a power cut or the status of network disconnection.

An exemplary object of the present invention is to provide an information processing device, a control method, and a program for solving the problem mentioned above.

Means For Solving the Problem

An information processing device according to a first exemplary aspect of the present invention includes: a state determination unit that determines a change in a state of connection between the information processing device and an external device or a power supply; a cause selection unit that selects from a plurality of choices, a cause of the determined change in the state of connection; and a processing unit that performs a process in accordance with the selected choice.

A control method according to a second exemplary aspect of the present invention is a control method for an information processing device, and includes: determining a change in a state of connection between the information processing device and an external device or a power supply; selecting from a plurality of choices, a cause of the determined change in the state of connection; and performing a process in accordance with the selected choice.

A program according to a third exemplary aspect of the present invention causes a computer of an information processing device to execute: determining a change in a state of connection between the information processing device and an external device or a power supply; selecting from a plurality of choices, a cause of the determined change in the state of connection; and performing a process in accordance with the selected choice.

Effect of the Invention

According to the present invention, in a case where there is a change in the state of connection with an external device or a power supply, handling in accordance with the change is possible.

EMBODIMENTS FOR CARRYING OUT THE INVENTION

First Exemplary Embodiment

Hereunder, an edge terminal device according to a first exemplary embodiment of the present invention is described, with reference to FIG. 1 to FIG. 6.

Figure 1:
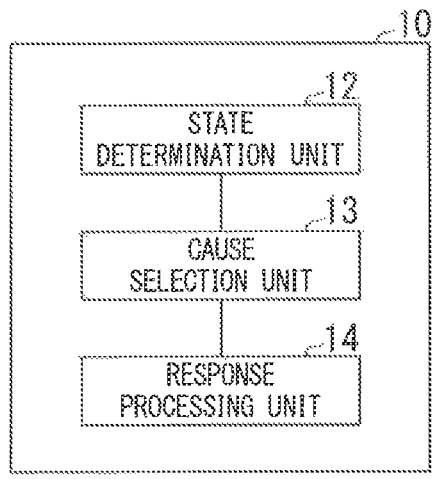
FIG. 1 is a diagram showing a configuration of an edge terminal device according to a first exemplary embodiment of the present invention.

FIG. 1 is a diagram showing a configuration of an edge terminal device according to the first exemplary embodiment of the present invention.

FIG. 1 shows an edge terminal device 10. The edge terminal device 10 is installed, for example, at a retail premises. The edge terminal device 10 is a device that performs operations required in transmitting information of customers that visit the retail premises, to a server terminal device at a data center or the like. The edge terminal device 10 is an information processing device that is arranged at a location that serves as a boundary between a cloud side device and an end user side device in so-called cloud computing. As shown in FIG. 1, the edge terminal device 10 includes at least with a state determination unit 12, a cause selection unit 13, and a response processing unit 14.

Figure 2:
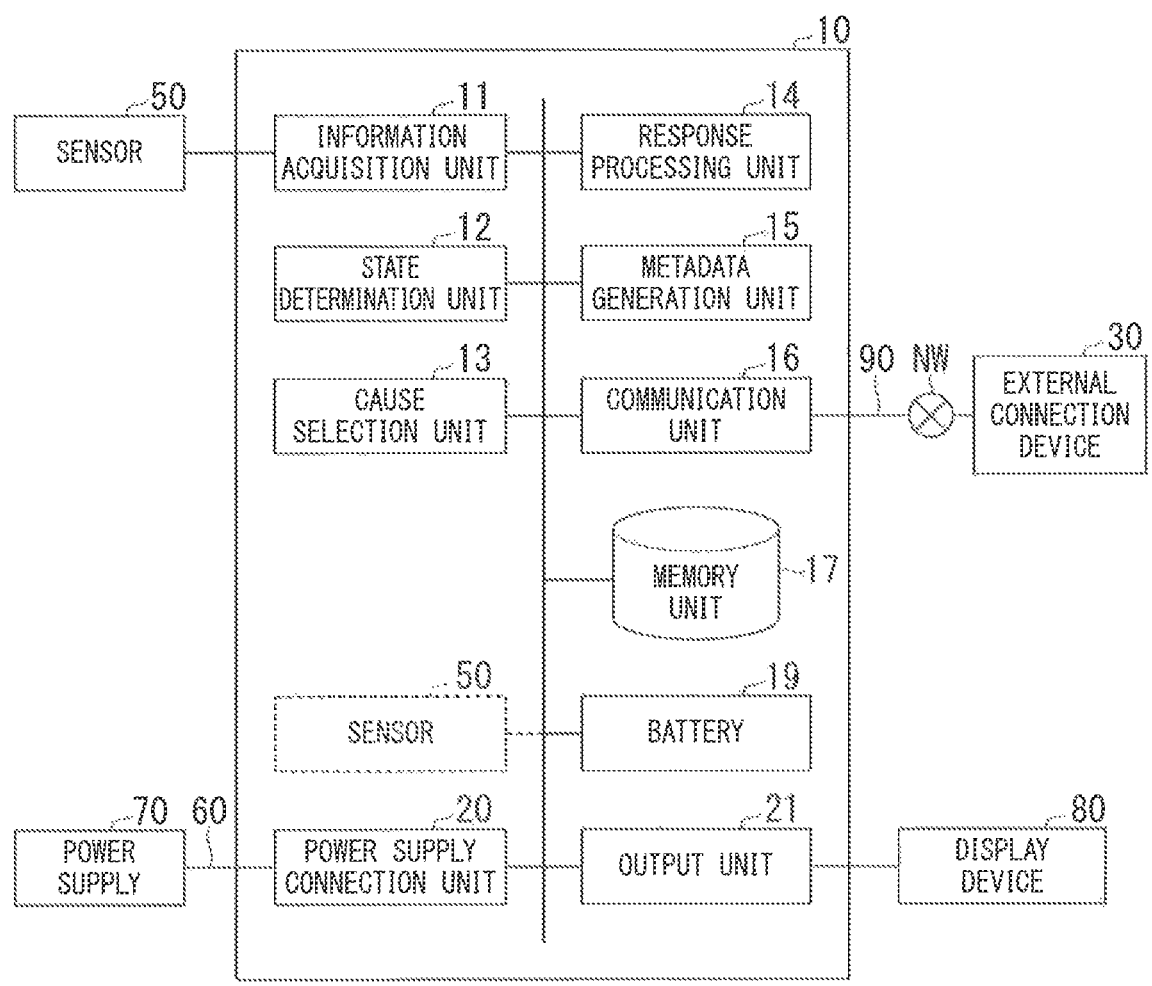
FIG. 2 is a diagram showing a specific configuration of the edge terminal device according to the first exemplary embodiment of the present invention.

The state determination unit 12 determines the state of connection between the edge terminal device 10 and an external device (another device, a device) or a power supply (a power supply 70, refer to FIG. 2). The external device may be a network NW or an external connection device (device) 30 (refer to FIG. 2). For example, the state determination unit 12 determines the power supply as being cut when a power cable 60 (refer to FIG. 2) is removed from the edge terminal device 10. The state determination unit 12 may determine the power supply as being cut (the state of connection between the edge terminal device 10 and the power supply as having changed) when supply of electric power from the power supply to the edge terminal device 10 is cut. The state determination unit 12, for example, determines disconnection from the network NW when a network cable 90 (refer to FIG. 2) is removed from the edge terminal device 10. The edge terminal device 10 includes a battery (secondary battery) 19 (refer to FIG. 2). The edge terminal device 10, even if disconnected from the power supply, is still capable of operating for an execution time with use of electric power supplied from the battery 19

The cause selection unit 13 selects from a plurality of choices, a cause of change in the state of connection. The plurality of choices are, for example, theft, disaster, and power cut. For example, if the edge terminal device 10 is disconnected from the power supply or the network NW as a result of being stolen and removed, the cause selection unit 13 selects theft as the cause of the change in the edge terminal device 10, based on information detected by a sensor 50 (refer to FIG. 2) connected to the edge terminal device 10. Moreover, the cause selection unit 13 has an image recognition function.

The response processing unit 14 performs a process that corresponds to the cause selected by the cause selection unit 13, after the change has occurred in the state of connection with the external device (network) or with the power supply. For example, in the case where the cause selection unit 13 selects theft as the cause of the change in the edge terminal device 10, the response processing unit 14 locks or removes data stored in the edge terminal device 10 to thereby prepare for theft.

FIG. 2 is a diagram showing a specific configuration of the edge terminal device according to the first exemplary embodiment of the present invention.

As shown in FIG. 2, the edge terminal device 10 includes an information acquisition unit 11, the state determination unit 12, the cause selection unit 13, the response processing unit 14, a metadata generation unit 15, a communication unit 16, a memory unit 17, the battery 19, a power supply connection unit 20, and an output unit 21.

The information acquisition unit 11 acquires, from a single or a plurality of sensors 50 installed in a space where customers are present, information detected by the sensors 50. An example of the sensor 50 is a GPS (global positioning system) receiver that is provided in the edge terminal device 10. The information acquisition unit 11 acquires position information of the edge terminal device 10 from this GPS receiver. Another example of the sensor 50 is an acceleration sensor that is provided in the edge terminal device 10. The information acquisition unit 11 acquires acceleration information of the edge terminal device 10 from this acceleration sensor. Another example of the sensor 50 is a camera (an image capturing device) that is connected to the edge terminal device 10. The information acquisition unit 11 acquires, from this camera, image data captured by the camera. The image data includes motion images and still images. Other examples of the sensor 50 include a microphone and a thermometer. The edge terminal device 10 may have the sensors 50 built-in.

The metadata generation unit 15 analyzes image data acquired by the information acquisition unit 11 with use of commonly known image recognition, and generates metadata. The metadata includes, for example, information such as age, gender, traffic line, and at-shelf behavior of customers. The metadata generation unit 15 transmits the generated metadata to the server terminal device at the data center via the communication unit 16. The traffic line is information that indicates, for example, a path within the retail premises along which a customer moves. The at-shelf behavior refers to a type of behavior related to product selection that a customer performs in front of a product shelf.

The communication unit 16 communicates with the external connection device (another device) 30 provided outside the edge terminal device 10. The external connection device 30 is, for example, another edge terminal device provided within the retail premises, or a server terminal device at the data center. The communication unit 16 may be connected to the network NW via the network cable 90. The communication unit 16 may be connected to the external connection device 30 via the network NW. At least either one of the external connection device 30 and the network NW may be an example of the "external connection device".

The memory unit 17 stores a program and various types of information.

The power supply connection unit 20 is connected via the power cable 60 to the power supply 70 that is provided outside the edge terminal device 10.

The state determination unit 12, the cause selection unit 13, the response processing unit 14, and the metadata generation unit 15 are functions that are realized by means of a CPU (central processing unit) executing the program.

Figure 3:
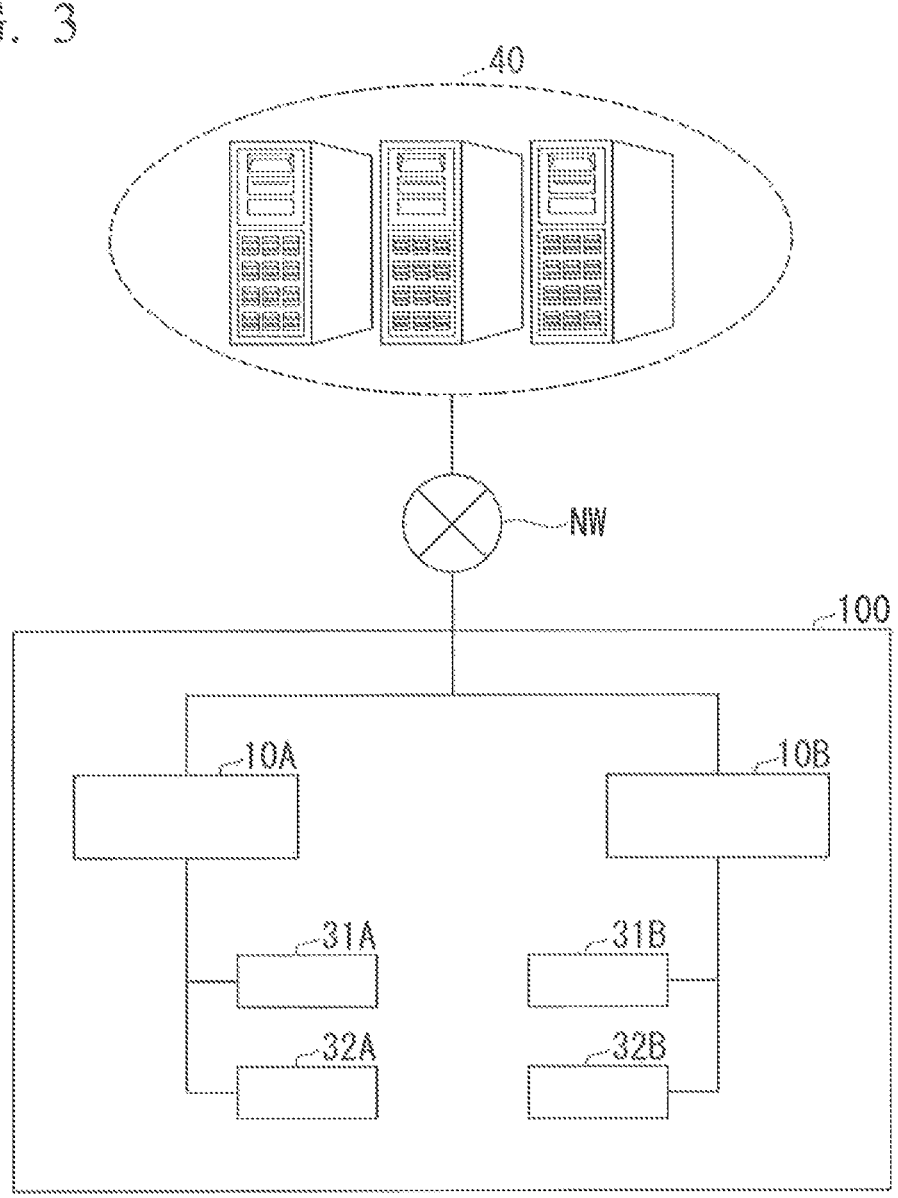
FIG. 3 is a diagram showing an example of an information processing system according to the first exemplary embodiment of the present invention.

FIG. 3 is a diagram showing an example of an information processing system according to the first exemplary embodiment of the present invention.

The information processing system shown in FIG. 3 includes a plurality of edge terminal devices 10A and 10B, two cameras 31A and 31B, two cameras 32A and 32B, and a server terminal device 40. The plurality of edge terminal devices 10A and 10B are installed at a retail premises 100. The two cameras 31A and 31B are connected to the edge terminal device 10A. The two cameras 32A and 32B are connected to the edge terminal device 10B. The server terminal device 40 is provided at a data center. The edge terminal device 10A is connected to the cameras 31A and 32A. The edge terminal device 10B is connected to the cameras 31B and 32B. Moreover, the edge terminal device 10A and the edge terminal device 10B are connected so as to be able to communicate with each other by means of wireless communication or the like. The edge terminal device 10A may, for example, transmit image data that is captured by the cameras 31A and 32A connected thereto (the edge terminal device 10A), to the edge terminal device 10B. The edge terminal device 10B may also generate metadata that targets behaviors of customers in a wider range, based on image data transmitted from the edge terminal device 10A, and image data captured by the cameras 31B and 32B connected thereto (the edge terminal device 10B). Similarly, the edge terminal device 10A may also generate metadata by acquiring image data captured by the cameras 31A and 32B and using the image data. The edge terminal devices 10A and 10B are connected to the server terminal device 40 of the data center via the network NW. A marketing system is operating on the server terminal device 40. Hereinafter, the edge terminal devices 10A and 10B are referred to collectively as edge terminal devices 10. Also, the cameras 31A and 31B are referred to collectively as cameras 31. Similarly, the cameras 32A and 32B are referred to collectively as cameras 32.

The edge terminal devices 10A and 10B are installed in the vicinity of locations where customers travel in the retail premises 100. The edge terminal devices 10A and 10B are each connected to at least one of the cameras 31 and 32, and acquire image data captured by the cameras 31 and 32.

The output unit 21 of the edge terminal devices 10A and 10B is connected to a display device 80 that is used for digital signage or the like (refer to FIG. 2). The output unit 21 may output advertising information to the display device 80 to thereby provide useful information to customers.

The edge terminal devices 10A and 10B transmit metadata that is generated based on image data, to the server terminal device 40 at a predetermined timing.

The server terminal device 40 is an information processing device such as a PC server, and is installed at a data center for example. The server terminal device 40 is a cloud side server terminal device in so-called cloud computing. The server terminal device 40 receives metadata from the edge terminal devices 10A and 10B, and accumulates it in the memory unit. The server terminal device 40 performs marketing analysis, using a vast amount of accumulated metadata. The server terminal device 40 may compute top selling products for each age group and/or each gender. The server terminal device 40 may, from a customer traffic line within the retail premises, calculate a location where many customers are traveling, and generate information that may be a useful reference for product arrangement locations.

As described above, the edge terminal devices 10A and 10B are installed at locations relatively near customers, rather than at a heavily secured data center. There, it may be considered that a malicious person may take away the edge terminal devices 10A and/or 10B. If the edge terminal devices 10A and/or 10B are taken away, metadata and/or customer image data stored in the edge terminal devices 10A and/or 10B are leaked to the outside. Therefore, if the edge terminal devices 10A and/or 10B are stolen, it is necessary to take a response process such as locking data and deleting data so that leakage of personal information will be prevented. In a case where the edge terminal device 10A is stolen, it may be assumed that the network connection of the edge terminal device 10A is cut, or the connection with the power supply is cut. Consequently, in the first exemplary embodiment, a cut in the connection between the edge terminal device 10A and the edge terminal device 30 (or the connection between the edge terminal device 10A and the network NW), or a cut in the connection between the edge terminal device 10A and the power supply triggers the edge terminal device 10A to autonomously perform a response process such as locking data.

As described above, the edge terminal devices 10A and 10B, in some cases, are connected to a display device 80 to provide information to customers. For example, in an event of a disaster such as an earthquake, it is preferred that advertising information displayed on the display device 80 can be changed to information for notifying an earthquake situation, or to an emergency exit guidance display. Also in the case of a large-scale disaster, it may be assumed that the network connection is cut, or the connection with the power supply is cut. Consequently, in the first exemplary embodiment, a cut in the connection with an external device (that is, another device such as a network, the same shall apply hereafter), or a cut in the connection with the power supply triggers a process of outputting information required at the time of a disaster, to be performed.

As described above, the edge terminal devices 10A and 10B are not to be installed at a well-equipped data center. Therefore, there may be a case, for example, where stable supply of electric power from a power supply facility is not possible. At a time of this type of power cut, if processes continue to be performed as usual, power supply of the battery 19 will be consumed. Consequently, in the external exemplary embodiment, a cut in the connection with the external device, or a cut in the connection with the power supply triggers a response process to be performed to switch the operation of the edge terminal devices 10A and 10B, so that the edge terminal devices 10A and 10B perform bare essential operations only, for example.

If a response process such as locking data is uniformly performed in a case where the network connection is cut or the connection with the power supply is cut, data locking will also be performed even when, for example, the edge terminal device 10A is moved by a store staff member for a work-related situation and it is not actually stolen. In this case, there is a problem in that unlocking becomes troublesome. Consequently, in the first exemplary embodiment, based on information acquired from the cameras connected to the edge terminal device 10 and/or the built-in sensors, a cause is accurately selected from the choices of cause (theft, disaster, and power cut) for the cut in the network connection, and a response process suitable for the cause is performed. Moreover, in a case where it does not match any one of theft, disaster, and power cut, the cause is determined, for example, as being a temporary network line cut or power supply instability, and normal operation continues to be performed.

Next is described a method of determining a response process method suitable for a situation to be performed by the edge terminal device 10, and autonomously controlling the device itself.

Figure 4:
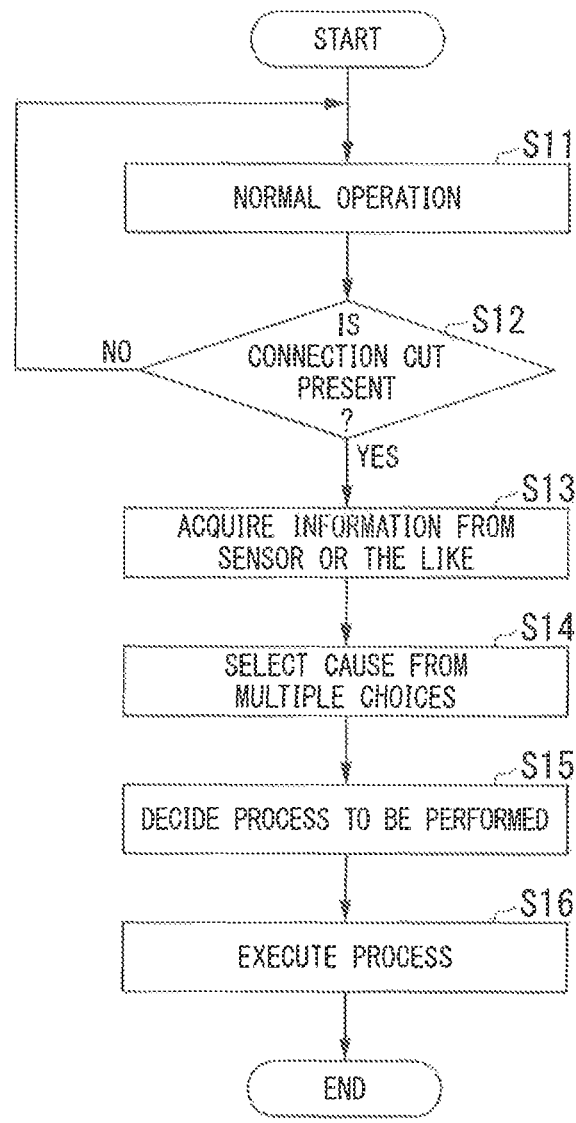
FIG. 4 is a first diagram showing a process flow of the edge terminal device according to the first exemplary embodiment of the present invention.

FIG. 4 is a first diagram showing a process flow of the edge terminal device 10 according to the first exemplary embodiment of the present invention.

Figures 5, 6:
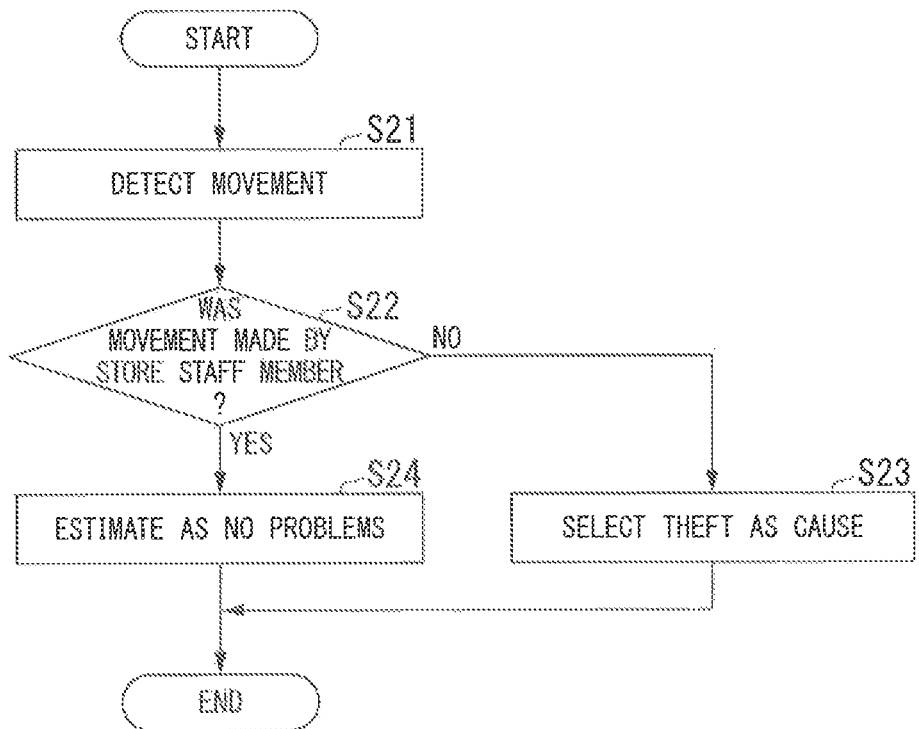
FIG. 5 is a diagram showing an example of a data table used by the edge terminal device according to the first exemplary embodiment of the present invention.
FIG. 6 is a second diagram showing a process flow of the edge terminal device according to the first exemplary embodiment of the present invention.

FIG. 5 is a diagram showing an example of a data table used by the edge terminal device 10 according to the first exemplary embodiment of the present invention.

It is assumed that the state of the retail premises 100 is in a state of being image-captured by the cameras 31A and 32A. Moreover, the information acquisition unit 11 acquires image data from the cameras 31A and 32A at predetermined time intervals. Also, the information acquisition unit 11 acquires position information from the GPS receiver (sensor 50) provided in the edge terminal device 10A, at predetermined time intervals. Furthermore, the information acquisition unit 11 acquires acceleration information from the acceleration sensor (sensor 50) provided in the edge terminal device 10A, at predetermined time intervals.

First, the edge terminal device 10A performs the normal process (Step S11). Specifically, the information acquisition unit 11 acquires image data and outputs it to the metadata generation unit 15. The metadata generation unit 15 extracts customer information by means of commonly known image recognition, and generates metadata. Metadata refers to information in the form of text data that expresses information required for a marketing analysis such as age, gender, traffic lines, products seen, and products picked up of/by customers. The metadata generation unit 15 transmits the generated metadata to the server terminal device 40 at the data center via the communication unit 16.

Next, in the edge terminal device 10A, the state determination unit 12 determines whether or not a cut in the connection with the external device (the network NW or the external connection device 30) or a cut in the connection with the power supply (the power supply 70) has occurred (Step S12). If the state determination unit 12 does not determine a cut as having occurred in the connection with the external device or the power supply (Step S12: NO), the edge terminal device 10A repeats to perform the normal process of Step S11. If the state determination unit 12 determines a cut as having occurred in the connection between the edge terminal device 10A and the network or the power supply (Step S12: YES), the cause selection unit 13 acquires image data, position information, and acceleration information from the information acquisition unit 11 (Step S13). Next, the cause selection unit 13 selects from a plurality of choices, a cause of the cut in the connection (Step S14). The plurality of choices are, for example, theft, disaster, and power cut. As a specific example, here is described a case where the cause selection unit 13 detects the edge terminal device 10A as having been moved by a predetermined distance or more, based on acceleration information that is acquired over a predetermined period of time and that indicates the acceleration of the edge terminal device 10A. In this case, the cause selection unit 13 determines the edge terminal device 10A as having been moved by theft, and selects theft as the cause of the cut in the connection with the network. As another specific example, here is described a case where the cause selection unit 13 detects the position of the edge terminal device 10A as having been changed by a predetermined distance or more, based on position information that is acquired at predetermined time intervals and that indicates the position of the edge terminal device 10A. In this case, the cause selection unit 13 determines the edge terminal device 10A as having been moved by theft, and selects theft as the cause of the cut in the connection with the power supply. The edge terminal device 10A is still capable of operating for a while even when disconnected from the power supply because the battery 19 is provided therein.

As another specific example, here is described a case where the cause selection unit 13 analyzes several sets of image data acquired over a predetermined period of time by means of commonly known image recognition, and detects motions of several product shelves falling from their vertically standing attitudes, or a case where it analyzes the image data and detects a product shelf, and detects the product shelf as being in an attitude angled by a predetermined angle or greater. In these cases, the cause selection unit 13 determines a disaster such as an earthquake as having occurred, and selects disaster as the cause of the cut in the connection with the power supply.

As another specific example, the cause selection unit 13 may recognize facial expressions of a customer or a staff member captured in the image data by means of a facial recognition technique, and may determine a disaster as having occurred if, for example, it recognizes "fear" in the facial images of a predetermined number or more of people. As another specific example, in a case where a microphone is provided as the sensor 50, and the cause selection unit 13 has a voice recognition function, recognition of screaming or the like may be used as a reference for determining a disaster as occurring. As another specific example, a temperature sensor may be provided as the sensor 50, and a temperature detected by the temperature sensor, being a predetermined temperature or higher, may be used as a reference for determining the occurrence of a disaster such as a fire. Moreover, in this case, the cause selection unit 13 may detect flames from the image data, based on flame shimmer characteristics for example, and being able to detect a flame may be used as a determination reference.

As another specific example, here is described a case where the cause selection unit 13 detects a cut in the connection with the power supply and the external device. In this case, if the device on the other end of the cut connection is, for example, a device that is not provided with a battery, such as a sensor, and the device on the other end of the maintained connection is, for example, a device that is provided with a battery, such as the edge terminal device 10B, power cut is selected as the cause of the cut in the connection with the power supply. The memory unit 17 preliminarily records information as to whether or not the devices that are connected to this device itself have a battery.

The selection as to whether the connection cut is due to theft, disaster, or power cut in this Step S14 is a determination of whether or not the cause still allows normal operation. That is to say, the cause selection unit 13 detects a cut in the connection with the power supply or the external device. Furthermore, if the cause is determined as not being any one of theft, disaster, and power cut described above, the cause selection unit 13 determines that the cause of the connection cut is due to, tor example, temporary network instability or power supply instability, and therefore it poses no problems.

The cause selection unit 13 outputs information that indicates the selected cause to the response processing unit 14.

Next, the response processing unit 14 decides the process to be performed, based on the information that is acquired from the cause selection unit 13 and that indicates the cause, and a state process table. Here, the state process table is described with reference to FIG. 5. FIG. 5 is an example of the state process table. As shown in FIG. 5, the state process table has items namely "cause" and "response process". The item of "cause" stores information that indicates causes of a cut in the connection with the power supply or the external device. The item of "response process" stores information that indicates response processes suitable for causes. The response processing unit 14 takes the information that is acquired from the cause selection unit 13 and that indicates the cause, as a key to read this table, and reads out a response process that corresponds to the cause. The response processing unit 14 decides the read-out response process as the process to be performed.

For example, if the cause selection unit 13 selects "theft" as the cause of a connection cut, the response processing unit 14, as a response process, decides to lock data 17 stored in the memory unit 17 of the edge terminal device 10A. Data locking may refer to implementing password protection so that information cannot be viewed even if an attempt is made to access metadata generated by the metadata generation unit 15 and/or image data acquired from the information acquisition unit 11. Also, "data deletion" may be set as a response process for "theft" of the state process table. In this case, the response processing unit 14 performs a response process of deleting confidential information such as metadata and image data. Thereby, it is possible to prevent information leakage.

For example, if the cause selection unit 13 selects "disaster" as the cause of a connection cut, the response processing unit 14, as a response process, decides to operate the edge terminal device 10A in a disaster mode. The disaster mode is an operation of displaying the occurrence of a disaster or details of a disaster, performing emergency exit guidance, or displaying actions to be taken at the time of a disaster. For example, in the case where communication with the outside is possible, the response processing unit 14 may acquire the latest disaster information and may output it to the display device 80 connected to the edge terminal device 10A. Alternatively, the response processing unit 14 may read preliminarily stored information, such as things to be careful of in the event of disaster, from the memory unit 17, and may output it to the display device 80 connected to the edge terminal device 10A. As a result, it is possible to achieve an effect of ensuring customers' safety, and preventing unwanted trouble in the event of a disaster.

For example, if the cause selection unit 13 selects "power cut" as the cause of a connection cut, the response processing unit 14 decides to perform the operation within a restricted range where the process of the edge terminal device 10A can be performed with the battery 19. For example, in a case where network devices such as a router, which controls communication with an external network, is not operating due to a power cut, the response processing unit 14 performs control so that the metadata generated by the metadata generation unit 15 will not be transmitted to the server terminal device 40. The metadata generation unit 15 records flag information that indicates unsent status, while associating it with unsent metadata, so that unsent metadata can be transmitted when power is restored.

For example, when the remaining capacity of the battery 19 becomes below a predetermined capacity, the response processing unit 14 determines the edge terminal device 10A as being unable to operate any longer, records information that is recorded on a volatile memory medium such as a memory, into a non-volatile memory medium such as a hard disk, and stops the edge terminal device 10A in a legitimate procedure. As a result, data is maintained reliably.

If the cause selection unit 13 selects "no problems", the response processing unit 14 decides to continue to operate while the process of the edge terminal device 10A is maintained in the normal processing. However, for example, if the network connection with the server terminal device 40 at the data center is cut, the response processing unit 14 performs control so that transmission of metadata will not be performed.

Next, based on the decision made in Step S14, the response processing unit 14 executes a response process suitable for each of "theft", "disaster", "power cut", and "no problems".

According to the first exemplary embodiment, based on the state of connection with the sensor 50 and/or the external device connected directly or indirectly to the edge terminal device 10, or sensing information collected by the sensor 50, the edge terminal device 10 can autonomously determine an operation to be performed and execute it, using a detected event (such as a cut in the connection between the edge terminal device and the cloud, and power supply stop) to which several factors are considered, as a trigger. Since the edge terminal device 10 is capable of automatically performing an appropriate role according to the situation, data protection and ease of use can both be achieved at the same time. For example, if data protection is prioritized in each of those cases mentioned above, in an environment where network connection and power supply are not stable, data locking occurs frequently, resulting in significant trouble in the normal processing. However, with application of the first exemplary embodiment, this type of trouble will not occur.

FIG. 6 is a second diagram showing a process flow of the edge terminal device according to the first exemplary embodiment of the present invention.

With reference to FIG. 6, here is described another method for the cause selection unit 13 to select "theft" as a cause of a cut in the connection with the power supply or the like. According to this method, the operation of switching, which is a human-operated operation when changes occur in the process due to environmental changes such as installation location, is no longer required, and this leads to cost reduction.

The preconditions are the same as those of FIG. 4. Moreover, it is assumed that the edge terminal device 10A has moved, and there has been a cut in the connection with the edge terminal device or in the connection with the power supply.

First, based on the acceleration information and/or the position information acquired from the information acquisition unit 11, the cause selection unit 13 detects the edge terminal device 10A as having moved, for example, by a predetermined distance or more (Step S21). Next, based on the image data captured by the cameras 31A and 32B and acquired from the information acquisition unit 11, the cause selection unit 13 determines whether or not this movement is a movement made by a store staff member (Step S22). Specifically, the cause selection unit 13 analyzes the image data that has been acquired a predetermined length of time prior to this point in time with use of commonly known image recognition, and determines whether or not the store staff member has moved the edge terminal device 10A. Moreover, here is described a case, for example, where the installed position of the edge terminal device 10A is not included in the image data captured by the cameras 31A and 32A, and the installed position of the edge terminal device 10A is included in the image data captured by the cameras 31B and 32B. In this case, the cause selection unit 13 may acquire the image data captured by the cameras 31B and 32B from the edge terminal device 10B via the communication unit 16, and may analyze the image data. Images of faces of store staff members and/or images of staff uniforms are preliminarily recorded in the memory unit 17. The cause selection unit 13, for example, compares, against the facial images of the staff members and/or the images of the uniforms, a facial image of a person captured in an acquired image data and/or an image of a uniform in which the person is dressed, by means of a commonly known technique such as pattern recognition, to thereby determine whether or not the person is a store staff member.

If the cause selection unit 13 determines it as being a movement made by a store staff member (Step S22: YES), the cause selection unit 13 determines the movement of the edge terminal device 10A as arising from an intended moving operation performed by a rightful person. Therefore, the cause selection unit 13 decides that the movement that caused the connection cut has no problems (Step S24). That is to say, the cause selection unit 13 selects "no problems" as the cause of the change in the connection state.

The cause selection unit 13 outputs the result of the selection to the response processing unit 14. Based on the result of the decision and the state process table shown as an example in FIG. 5, the response processing unit 14 continues to perform the normal operation (normal process).

If the cause selection unit 13 determines it as not being a movement made by a store staff member (Step S22: NO), the cause selection unit 13 determines the movement of the edge terminal device 10A as not arising from an intended moving operation performed by a rightful person. Therefore, the cause selection unit 13 selects theft as the cause of the connection cut, from the plurality of choices (Step S23). The cause selection unit 13 outputs the result of the selection to the response processing unit 14. Based on the result of the selection and the state process table shown as an example in FIG. 5, the response processing unit 14 performs a response process such as data locking.

According to the method of FIG. 6, for example, also in a case where a store staff member moves the edge terminal device 10 due to a change in the layout of the retail premises 100, uniform data locking will not be performed, and therefore, the store staff member will not have to perform lock releasing.

In FIG. 6, here has been described as an example the case where the cause selection unit 13 selects theft as the cause of the connection cut. The application is still possible even if the cause is a power cut for example. In a case of a power cut, it is, for example, assumed that a connection cut of a device provided with a battery has been detected by the state determination unit 12. However, as long as the cameras 31 and 32 have image-captured a movement of a store staff member separating the device from the edge terminal device 10, even if another device that is disconnected is provided with a battery, the device need not be considered when selecting power cut as the cause of the connection cut.

Second Exemplary Embodiment

Hereunder, an information processing system according to a second exemplary embodiment of the present invention is described, with reference to FIG. 7 to FIG. 10.

Figures 7, 8:
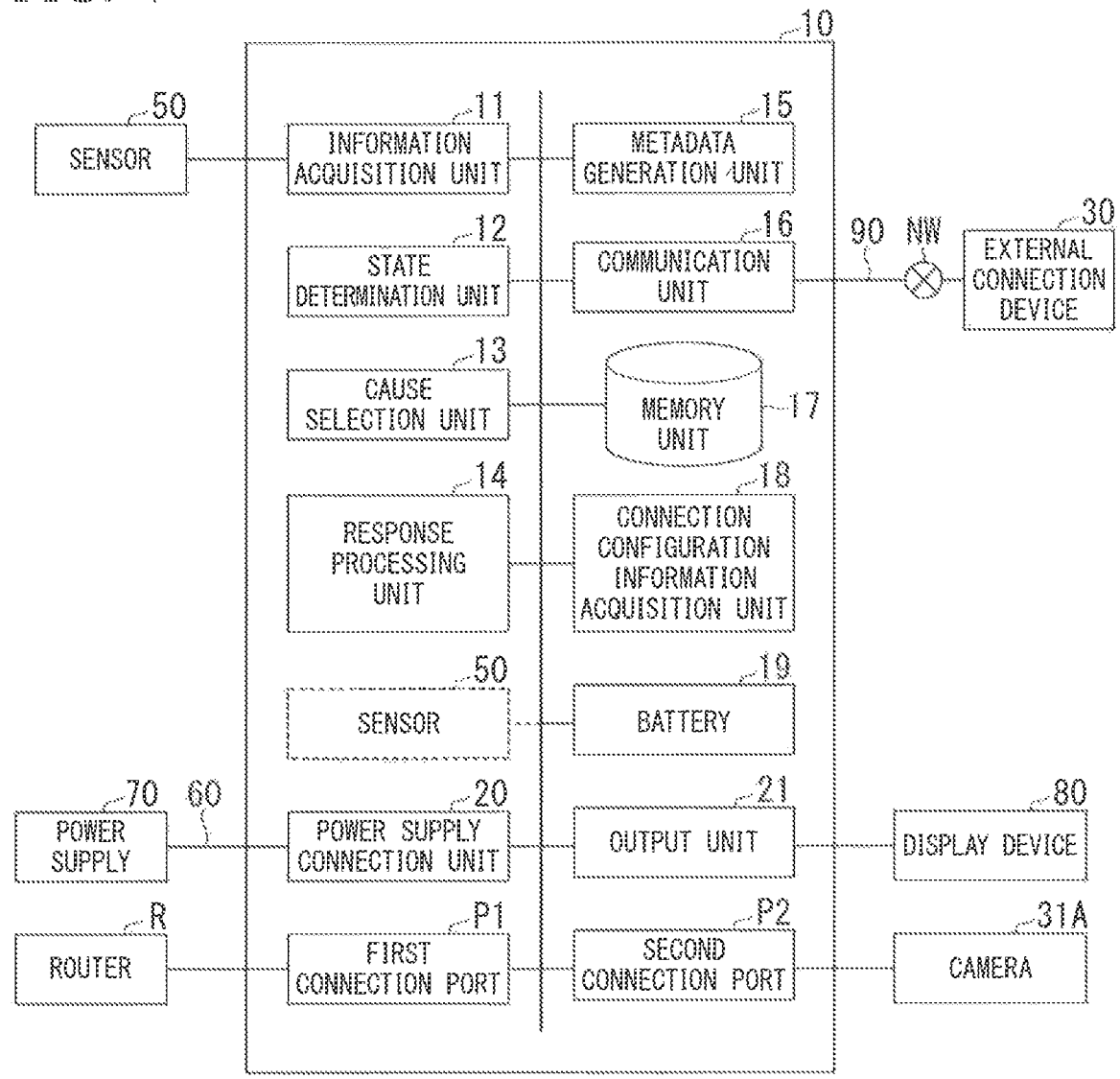
FIG. 7 is a diagram showing a specific configuration of an edge terminal device according to a second exemplary embodiment of the present invention.
FIG. 8 is a diagram showing an example of a data table used by the edge terminal device according to the second exemplary embodiment of the present invention.

FIG. 7 is a diagram showing a specific configuration of an edge terminal device 10 (10A, 10B) according to the second exemplary embodiment of the present invention.

The portion of the second exemplary embodiment that differs from the first exemplary embodiment is described, with reference to FIG. 7. As shown in FIG. 7, the edge terminal device 10 of the second exemplary embodiment includes a connection configuration information acquisition unit 18, a first connection port P1, and a second connection port P2. Other configurations of the edge terminal device 10 of the second exemplary embodiment are similar to those of the first exemplary embodiment.

The first connection port P1 is connected to a router (an external device, an external connection device, or a device) R. The second connection port P2 is connected to a camera (an external device, an external connection device, or a device) 31A.

The connection configuration information acquisition unit 18 acquires connection configuration information between the external device (another device, or a device) that is connected to the edge terminal device 10 and the edge terminal device 10. The connection configuration information is, for example, a piece of information that indicates a relationship between identification information of an external device and a connection port.

The connection configuration information acquisition unit 18 records the acquired connection configuration information into a connection configuration information table.

FIG. 8 is a diagram showing an example of a data table used by the edge terminal device 10 according to the second exemplary embodiment of the present invention.

FIG. 8 is an example of the connection configuration information table. The connection configuration information table has items, namely "device ID" and "connection port". The item of "device ID" stores identification information of devices connected to the edge terminal device 10. The item of "connection port" stores information that indicates which connection port of the edge terminal device 10 each device uses to be connected thereto. The connection configuration information acquisition unit 18 records the connection configuration information of each device into this table. For example, "xxxxx" of the first row is a MAC address of the router R that is connected to the device itself (the edge terminal device 10). The router is connected to the edge terminal device 10 via "LAN port 1". Moreover, "yyyyy" of the first row is a MAC address of the camera 31A that is connected to the edge terminal device 10. In the example shown in FIG. 7, "LAN port 1" corresponds to the first connection port P1. "USB port 1" corresponds to the second connection port P2.

Figure 9:
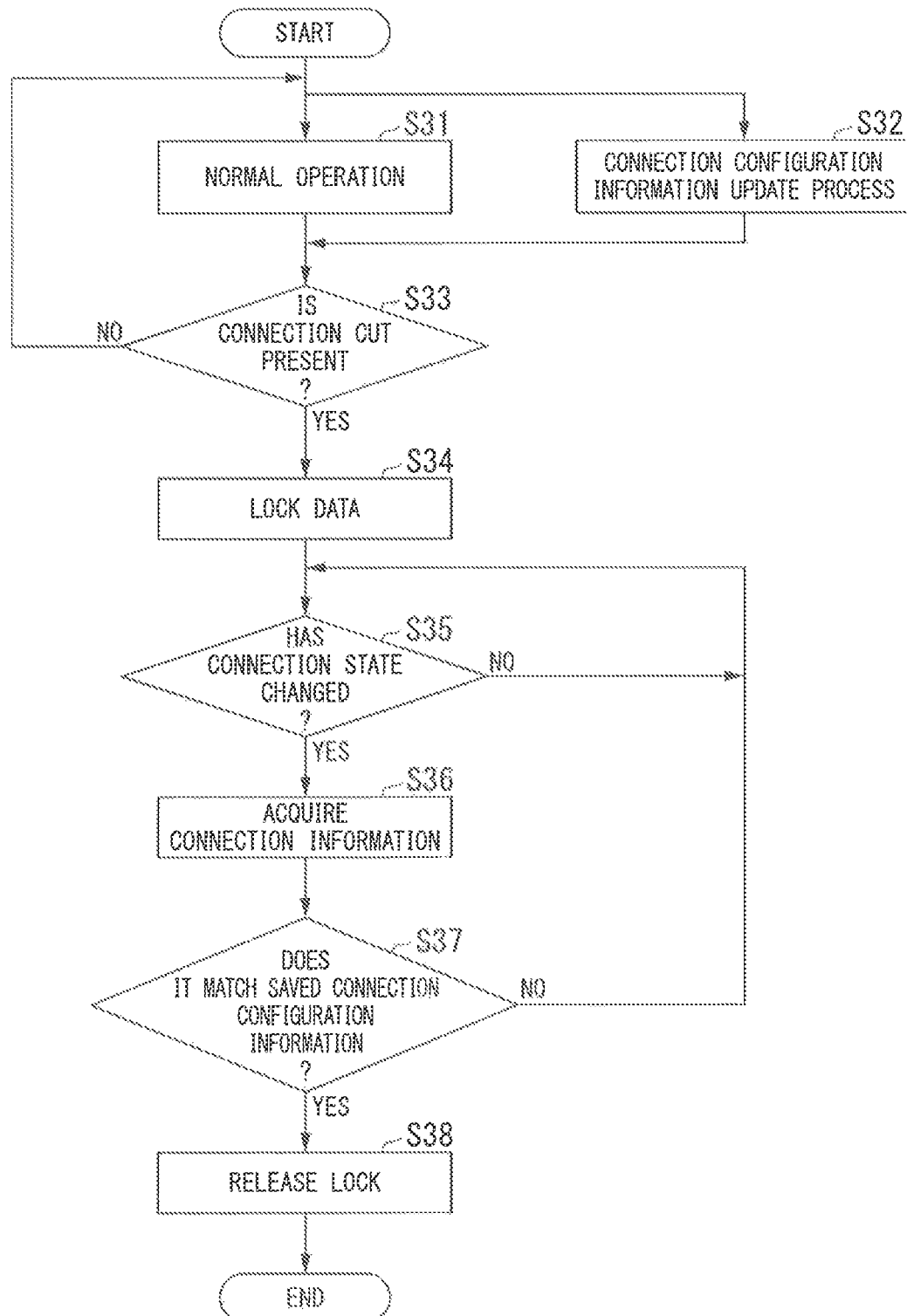
FIG. 9 is a first diagram showing a process flow of the edge terminal device according to the second exemplary embodiment of the present invention.

FIG. 9 is a first diagram showing a process flow of the edge terminal device 10 according to the second exemplary embodiment of the present invention.

The preconditions are the same as those of FIG. 4 of the first exemplary embodiment. Here is described an example of a case where a cut in the connection with the power supply or the like occurs as a result of movement of the edge terminal device 10.

First, the edge terminal device 10 performs the normal process (Step S31). The normal process is similar to that in Step S11 of FIG. 4. That is to say, the metadata generation unit 15 generates metadata, and transmits the generated metadata to the server terminal device 40 at the data center.

Alongside the process of Step S31, the connection configuration information acquisition unit 18 acquires connection configuration information of the device connected to the edge terminal device 10, at predetermined time intervals, and performs a connection configuration information acquisition unit update process that updates the connection configuration information table (Step S32).

Next, the state determination unit 12 determines whether or not a cut in the connection with the external device (the network NW, the external connection device 30, camera 31A, route R, or the like), or a cut in the connection with the power supply (the power supply 70, or the like) has occurred (Step S33). If the state determination unit 12 does not determine a cut as having occurred in the connection with the external device or the power supply (Step S33: NO), the edge terminal device 10 repeats to perform the processes of Step S31 and Step S32. If the state determination unit 12 determines a cut has occurred in the connection with the power supply or the like (Step S33: YES), the cause selection unit 13 determines the cause of the connection cut as being theft based on position information and/or acceleration information acquired by the information acquisition unit 11. The cause selection unit 13 outputs to the response processing unit 14 information that indicates the cause of the connection cut being theft. Next, the response processing unit 14 locks the data of the memory unit 17 (Step S34). Moreover, the connection configuration information acquisition unit 18 saves the connection configuration information at the point in time prior to the occurrence of the connection cut, by making a copy of the contents of the connection configuration information table at the point in time prior to the occurrence of the connection cut.

Next the state determination unit 12 determines whether or not there has been a change in the state of connection with the external device (Step S35). If the state determination unit 12 determines no change (Step S35: NO), the process of determining whether or not there has been a change in the state of connection with the external device, is repeated. If the state determination unit 12 determines a change as having been made (Step S35: YES), the state determination unit 12 notifies the connection configuration information acquisition unit 18 of the change in the state of connection with the external device. Then, the connection configuration information acquisition unit 18 acquires connection configuration information of the device that is connected to the edge terminal device 10 (Step S36). The connection configuration information acquisition unit 18 outputs the acquired connection configuration information to the cause selection unit 13. Next, the cause selection unit 13 compares the connection configuration information acquired from the connection configuration information acquisition unit 18 (connection configuration information after the change) with the connection configuration information at the point in time prior to the connection cut that is stored in the memory unit 17 (connection configuration information before the change), and determines whether or not they match with each other (Step S37). Taking the example of FIG. 8 for example, the cause selection unit 13 determines whether or not the device of the device ID value "xxxxx" (the router R) is connected to the "LAN port 1" and the device of the device ID value "yyyyy" (the camera 31A) is connected to the "USB port 1". If these conditions are satisfied, the cause selection unit 13 determines the acquired connection configuration information as matching with the saved connection configuration information. If even one of the pieces of the connection configuration information of either one of the "LAN port 1" and the "USB port 1" is different, the cause selection unit 13 determines the acquired connection configuration information as not matching with the saved connection configuration information. If these pieces of information are determined as not matching with each other (Step S37: NO), the cause selection unit 13 repeats the process from Step S35. If the acquired connection configuration information and the saved connection configuration information are determined as matching with each other (Step S37: YES), the cause selection unit 13 outputs a signal to instruct data lock release to the response processing unit 14. The response processing unit 14 then releases data lock (Step S38).

In the example shown in FIG. 9, there has been described the case of the cause of connection cut being theft. It is similar also in those cases of the cause being disaster or power cut.

Applying this to the process flow of FIG. 9, if the cause is disaster, the operation starts in the disaster mode in Step S34. After that, if each facility is restored from the disaster and the state of connection with the power supply and/or the external device is restored, the connection configuration information that was acquired after the connection cut matches with the connection configuration information that was acquired before the connection cut (Step S37). Therefore, the process returns to the normal process from the disaster mode operation (Step S38).

If the cause is power cut, restriction of the process range is performed in Step S34. After that, if the power is restored from the power cut and the state of connection with the power supply and/or the external device is restored, the connection configuration information that was acquired after the connection cut matches with the connection configuration information that was acquired before the connection cut (Step S37). Therefore, the restriction is released, and the process returns to the normal process (Step S38).

Figure 10:
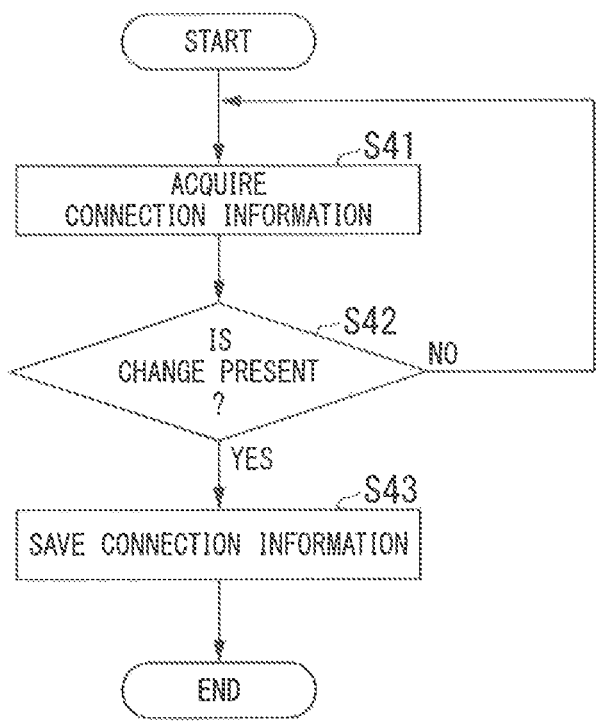
FIG. 10 is a second diagram showing a process flow of the edge terminal device according to the second exemplary embodiment of the present invention.

FIG. 10 is a second diagram, showing a process flow of the edge terminal device 10 according to the second exemplary embodiment of the present invention.

With reference to FIG. 10, the connection configuration information acquisition unit update process of Step S32 in FIG. 9 is described.

First the connection configuration information acquisition unit 18 scans each connection port provided in the device itself at predetermined time intervals, and acquires connection configuration information (Step S41). The connection configuration information acquisition unit 18 determines whether or not a change is present, by comparing the acquired information against the information recorded in the connection configuration information table of the memory unit 17 (Step S42). If no change is determined as being present, the connection configuration information acquisition unit 18 repeats the process from Step S41. If a change is determined as being present, the connection configuration information acquisition unit 18 updates the connection configuration information table with the contents of the newly acquired connection configuration information (Step S43).

According to the second exemplary embodiment, even in the case where the cause selection unit 13 selects theft as the cause of a connection cut, and the response processing unit 14 performs a process such as data locking, data lock can still be released automatically if connected to a system of the same system configuration as that prior to the connection cut. Thereby, even in the case where a store staff member has moved the system including the edge terminal device 10, there is no need for performing lock releasing. Moreover, even in the case where a cut occurs in the connection with an external device or a power supply as a result of a disaster or a power cut, the operation automatically returns to the normal process when restored from the disaster or the power cut. Therefore, the store staff member is not required to manually restore the operation of the edge terminal device 10. Particularly in the case of a power cut or a disaster, a large number of the edge terminal devices 10 are influenced thereby. Therefore the amount of human-performed operations can be reduced significantly.

Someone who steals the edge terminal devices 10 will not be able to configure a system in which the contents of the connection configuration information are equal before and after committing the theft, unless he/she stole several devices of the retail premises 100 and connects these devices in the same configuration as that of the original installation. Realistically, having a similar system configuration after committing theft is considered difficult. In the second exemplary embodiment, for shifting performed by a store staff member, releasing of data lock is performed automatically, while data lock can be expected to be in place continuously for theft.

The edge terminal device 10 described above has a computer therein. The step of each process of the edge terminal device 10 described above is stored in the form of a program on a computer-readable recording medium, and the computer reads and executes this program to thereby perform the above processes. The term "computer-readable recording medium" here refers to a medium such as a magnetic disk, a magnetic optical disk, a CD-ROM, a DVD-ROM, and a semiconductor memory. Moreover, this computer program may be distributed to a computer via a communication line, and the computer that receives this distribution may execute this program.

The above program may be a program for realizing part of the functions described above.

The above program may be a so-called difference file (difference program), which can realize the functions described above in combination with a program that is preliminarily recorded on a computer system.

In addition, the constituents of the above exemplary embodiment may be appropriately replaced by commonly known constituents, without departing from the scope of the invention. For example, motion image data may be audio data or still image data. Moreover, the technical scope of the present invention is not limited to the above exemplary embodiments, and various types of modifications may be made without departing from the scope of the invention. For example, the edge terminal device may be an information processing device equipped in a printer, a camera, a scanner, or the like provided in the retail premises 100.

The edge terminal device 10 is an example of an information processing device. The store staff member is an example of a specific user. For example, metadata transmission is an example of a function that becomes dysfunctional as a result of changes in the connection state in the case where a cut occurs in a network connection.

This application is based upon and claims the benefit of priority from Japanese patent application No. 2015-005769, filed Jan. 15, 2015, the disclosure of which is incorporated herein in its entirety by reference.

INDUSTRIAL APPLICABILITY

The present invention may be applied to an information processing device, a control method, and a program.

REFERENCE SYMBOLS

10 Edge terminal device
11 Information acquisition unit
12 State determination unit
13 Cause selection unit
14 Response processing unit
15 Metadata generation unit
16 Communication unit
17 Memory unit
18 Connection configuration information acquisition unit
31,32 Camera
40 Server terminal device
100 Retail premises

The invention claimed is:

1. An information processing device comprising:
at least one memory storing data and instructions; and
at least one processor configured to execute the instructions to:
determine a change in a state of connection between the information processing device and a power supply configured to supply electric power to the information processing device;
determine whether the information processing device has been moved by a predetermined distance or more;
determine whether the information processing device has been moved by an authorized person based on image data of a company or organization uniform and image data acquired by a camera;
lock the data when it is determined that the connection between the information processing device and the power supply is cut, it is determined that the information processing device has been moved by the predetermined distance or more, and it is determined that the information processing device has not been moved by the authorized person;
save first information that is acquired at a point in time prior to the connection between the information processing device and the power supply being cut, the first information being indicative of a connection configuration between the information processing device and a device connected to the information processing device;
acquire second information after the data is locked, the second information being indicative of the connection configuration between the information processing device and the device connected to the information processing device;
release the lock of the data when it is determined that the first information matches the second information; and
determine not to lock the data when it is determined that the connection between the information processing device and the power supply is cut, it is determined that the information processing device has been moved by the predetermined distance or more, and it is determined that the information processing device has been moved by the authorized person.

2. A control method for an information processing device, the method comprising:
determining a change in a state of connection between the information processing device and a power supply configured to supply electric power to the information processing device;
determining whether the information processing device has been moved by a predetermined distance or more;
determining whether the information processing device has been moved by an authorized person based on image data of a company or organization uniform and image data acquired by a camera;
locking data that is stored in a memory of the information processing device when it is determined that the connection between the information processing device and the power supply is cut, it is determined that the information processing device has been moved by the predetermined distance or more, and it is determined that the information processing device has not been moved by the authorized person;
saving first information that is acquired at a point in time prior to the connection between the information processing device and the power supply being cut, the first information being indicative of a connection configuration between the information processing device and a device connected to the information processing device;

acquiring second information after the data is locked, the second information being indicative of the connection configuration between the information processing device and the device connected to the information processing device;

releasing the lock of the data when it is determined that the first information matches the second information; and determining not to lock the data when it is determined that the connection between the information processing device and the power supply is cut, it is determined that the information processing device has been moved by the predetermined distance or more, and it is determined that the information processing device has been moved by the authorized person.

3. A non-transitory computer-readable recording medium storing a program that causes a computer of an information processing device to execute:

determining a change in a state of connection between the information processing device and a power supply configured to supply electric power to the information processing device;

determining whether the information processing device has been moved by a predetermined distance or more;

determining whether the information processing device has been moved by an authorized person based on image data of a company or organization uniform and image data acquired by a camera;

locking data that is stored in a memory of the information processing device when it is determined that the connection between the information processing device and the power supply is cut, it is determined that the information processing device has been moved by the predetermined distance or more, and it is determined that the information processing device has not been moved by the authorized person;

saving first information that is acquired at a point in time prior to the connection between the information processing device and the power supply being cut, the first information being indicative of a connection configuration between the information processing device and a device connected to the information processing device;

acquiring second information after the data is locked, the second information being indicative of the connection configuration between the information processing device and the device connected to the information processing device;

releasing the lock of the data when it is determined that the first information matches the second information; and determining not to lock the data when it is determined that the connection between the information processing device and the power supply is cut, it is determined that the information processing device has been moved by the predetermined distance or more, and it is determined that the information processing device has been moved by the authorized person.

4. The information processing device according to claim 1, wherein the first information comprises:
information that is indicative of a local area network (LAN) port of the information processing device and a media access control (MAC) address of a device connected to the LAN port, and information that is indicative of a universal serial bus (USB) port of the information processing device and a MAC address of a device connected to the USB port; and wherein the second information comprises:
information that is indicative of the LAN port and the MAC address of the device connected to the LAN port, and information that is indicative of the USB port and the MAC address of the device connected to the USB port.

* * * * *